United States Patent [19]

Balzer

[11] Patent Number: 4,705,110

[45] Date of Patent: Nov. 10, 1987

[54] PROCESS FOR INCREASING INJECTABILITY OF INJECTION WELLS IN OIL EXTRACTION BY MEANS OF WATER FLOODING

[75] Inventor: Dieter Balzer, Haltern, Fed. Rep. of Germany

[73] Assignee: Huels Aktiengesellschaft, Marl, Fed. Rep. of Germany

[21] Appl. No.: 901,702

[22] Filed: Aug. 29, 1986

[30] Foreign Application Priority Data

Aug. 31, 1985 [DE] Fed. Rep. of Germany ....... 3531214

[51] Int. Cl.$^4$ .............................................. E21B 43/22
[52] U.S. Cl. .................... 166/274; 166/275; 252/8.554
[58] Field of Search ............ 166/273, 274, 275, 305.1; 252/8.554

[56] References Cited

U.S. PATENT DOCUMENTS

| | | | |
|---|---|---|---|
| 2,978,409 | 4/1961 | Greenwald et al. | 252/8.554 |
| 3,016,351 | 1/1962 | Hessel et al. | 252/8.554 X |
| 3,346,047 | 10/1967 | Townsend et al. | 252/8.554 X |
| 4,165,785 | 8/1979 | Schievelbein | 166/274 |
| 4,212,748 | 7/1980 | Ferrell et al. | 166/246 X |
| 4,293,428 | 10/1981 | Gale et al. | 166/275 X |
| 4,406,798 | 9/1983 | Miller et al. | 166/246 X |
| 4,457,373 | 7/1984 | Balzer et al. | 166/275 X |
| 4,478,281 | 10/1984 | Balzer et al. | 166/273 X |
| 4,485,873 | 12/1984 | Balzer et al. | 166/273 X |
| 4,542,790 | 9/1985 | Balzer et al. | 166/273 |
| 4,582,138 | 4/1986 | Balzer | 166/273 |

OTHER PUBLICATIONS

Tenside Detergents 16, (1979), 5.
Balzer, D., Oil Gas-European Magazine 1/83, pp. 50–56.

*Primary Examiner*—George A. Suchfield
*Attorney, Agent, or Firm*—Millen & White

[57] ABSTRACT

The injectability of injection wells can be increased in oil extraction by means of water flooding, by injecting a solution, dispersion, or emulsion of carboxymethylated oxethylates of the formula

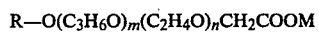

$$R-O(C_3H_6O)_m(C_2H_4O)_nCH_2COOM$$

in formation water or flooding water and, optionally, crude oil, into the injection well, the tenside being selected so that the phase inversion temperature of the system of reservoir oil/formation water or flooding water/tenside/optional additives lies at least 12° C. above the reservoir temperature.

16 Claims, No Drawings

PROCESS FOR INCREASING INJECTABILITY OF INJECTION WELLS IN OIL EXTRACTION BY MEANS OF WATER FLOODING

BACKGROUND OF THE INVENTION

In general, only a fraction of the originally present oil can be recovered by primary recovery methods when extracting oil from oil-bearing deposits. In this procedure, the oil flows to the surface on account of natural deposit pressure and is pumped to the surface of the earth from the bottom of the bore hole when the energy decreases.

A further increase in oil yield can be achieved by secondary measures. In the latter, water or gas is introduced under pressure by means of injection probes. The most frequently utilized method is so-called water flooding wherein either formation water, produced in a closed cycle, is reinjected or suitable flooding water is injected. In the latter case, care must be taken that the ions of the injected water are compatible with those of the formation water. Water flooding serves to supply energy to the reservoir as well as to control displacement of the oil toward the production probes. In order to cover a maximally large portion of the pore space (a volumetric throughflow efficiency degree is correspondingly defined), correspondingly suitable arrangements of injection and production probes must be selected; at the same time, very high water injection rates must be employed. It is desirable in many cases to inject the water into the aquifer, but in some instances the oil zone is likewise contacted to a large extent during this process. In the frequently utilized closed-cycle mode of operation, water flooding involves injection of water still containing residual oil since a quantitative separation of oil and water is only rarely accomplished in the separators.

However, whenever liquids immiscible with each other coexist in the pore space, capillary pressures occur. These are the higher, the higher the interfacial tensions between the two liquids and the smaller the pore diameters in the pore space. In the injection of water, i.e., during water flooding, these capillary pressures must be overcome by the injection pressure. Model calculations (cf. D. Balzer, Oil Gas 1 [1983]) show that the capillary pressures to be overcome are at an extremely high level, and consequently many of the narrower pores cannot be flooded. This finding is especially grave in its consequence in the direct vicinity of the injection probes, where large amounts of water must pass within a short period of time through a relatively small carrier surface.

A solution of this problem, namely raising the relative water permeability in the zones of the injection probes, must consist in greatly reducing the residual oil saturation in these zones. The depth of these regions need not be very great; about 3–20 m will be adequate in most cases.

This reduction of residual oil saturation in the injection probe zones should be successful, in accordance with the present state of the art of tertiary oil recovery, by using tensides in the form of microemulsions. In fact, U.S. Pat. Nos. 3,474,865, 3,467,188 and 3,718,187 disclose injection probe treatment methods wherein microemulsions or micellar dispersions are utilized, i.e., systems consisting of oil, aqueous solution, tenside, cotenside, and electrolytes. This solution to the problem, though, has the drawback that the amounts of tenside for the production of microemulsions are usually relatively high. Besides, the phase characteristic of a microemulsion depends in many cases on the tenside concentration, which latter decreases with increasing advancement of the tenside solution into the deposit due to adsorption processes. Correspondingly, the phase characteristic is altered from state III toward state II+ (cf. G. J. Hirasaki et al., SPE 8825 [1980]), leading in most instances to a strong rise in viscosity of the dispersion, the injectability being reduced thereby instead of being increased.

SUMMARY OF THE INVENTION

It is thus an object of this invention to provide an alternative improved solution.

Upon further study of the specification and appended claims, further objects and advantages of this invention will become apparent to those skilled in the art.

These objects have been achieved surprisingly by providing a process for increasing the injectability of injection wells in oil extraction by means of water flooding, by injecting a solution, dispersion, or water-external emulsion of a tenside in formation water or flooding water and optionally crude oil into the injection well, comprising utilizing as the tenside a carboxymethylated oxethylate of the formula

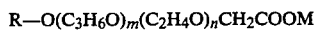

$$R\text{---}O(C_3H_6O)_m(C_2H_4O)_nCH_2COOM$$

wherein R is a linear or branched aliphatic residue of 6–20 carbon atoms, a monoalkylaromatic residue of 3–18 carbon atoms in the alkyl group, or a di- or oligoalkylaromatic residue of 1–16 carbon atoms per alkyl group, the total number of carbon atoms in the alkyl chains per molecule being 7–40; m is 0 to 20; n is 2 to 100; M is an alkali or alkaline earth metal ion or ammonium; and the degree of carboxymethylation is 10–100%, which is selected so that the phase inversion temperature of the system: reservoir oil/formation water or flooding water/tenside/optional additives, lies at least 12° C. above the reservoir temperature.

The tenside fluid to be injected suitably has a concentration of tenside of 0.05–7.0% by weight, based on the aqueous phase. The slug size of the tenside fluid to be injected should range between between 0.005 and 0.2 pore volume. After injecting the tenside slug, formation or flooding water is suitably forced into the reservoir.

Suitable additives for inclusion in the slug are other anionic tensides and/or mono- or polyhydride alcohols or alkyl ethers of polyhydric alcohols. The weight ratio of additives:carboxymethylated oxethylate is suitably 4:1 to 1:20.

In case an emulsion is injected, the water:oil ratio should be 20:1 to 1:2. Deposit oil or its mixtures, or crude oil fractions, should be utilized as the oil.

The phase inversion temperature of the system of reservoir oil/formation water or flooding water/tenside/optional additives is suitably 12°–140° C., preferably 15°–120° C., and especially 20°–120° C. above the reservoir temperature.

Surprisingly, a strong increase in injectability was observed with the mode of operation according to this invention under conditions which exclude the possibility of formation of a microemulsion and admit the assumption of the presence of an oil-in-water macroemulsion. The above-mentioned disadvantages of a microemulsion, namely the relatively high tenside concentrations and concomitantly high costs, as well as, in particular, the fluctuating phase relationships, are precluded by the process of this invention.

The carboxymethylated oxethylates are tensides compatible with waters of even extremely high total salinities and corresponding alkaline earth ion concentrations. They can be tailored, as disclosed in U.S. Pat. Nos. 4,457,373, 4,542,790, 4,485,873 and 4,478,281, all of which are entirely incorporated by reference herein, for the tenside flooding or micellar polymer flooding of a given reservoir. A criterion for this adaptation of the carboxymethylated oxethylate to the given reservoir system is the so-called phase inversion temperature (PIT). This is the temperature range wherein a water-external emulsion, consisting of deposit oil, deposit water, and tenside, changes over into an oil-external emulsion. Parallel phase studies indicate that a mesophase microemulsion is formed at the PIT. If the PIT of the system crude oil/formation water/tenside/optional additives is at the reservoir temperature or lies up to 10° C. thereabove, then—as has been demonstrated by displacement tests on examples of different deposit oils and reservoir waters—an optimum effect of the tenside can be expected with regard to oil mobilization and oil bank formation as discussed in the mentioned patents.

In this connection, the observation is entirely surprising that a superior increase in injectability using carboxymethylated oxethylates does not occur in the region of optimum oil mobilization and oil bank formation, but rather at substantially more hydrophilic tenside settings, i.e., with temperature differences of PIT minus reservoir temperature of markedly above 10° C.

The process of this invention, then, involves injecting a specific volume of a solution, dispersion, or emulsion of carboxymethylated oxethylates and optional additives in formation water or—if the latter is unavailable—in flooding water, into the injection probes of the oil reservoir either before initiating water flooding or at any point in time during water flooding. The carboxymethylated oxethylate is previously adapted to the reservoir in such a way that the PIT of the system of reservoir oil/formation water and optionally flooding water/tenside/optional additives lies at least 12° C., preferably 15° C. or more, above the reservoir temperature. In case of a high gas-oil ratio, live reservoir oil is to be utilized in these measurements.

The carboxymethylated oxethylates to be utilized in accordance with this invention satisfy the formula

R—O(C$_3$H$_6$O)$_m$(C$_2$H$_4$O)$_n$CH$_2$COOM wherein R is a linear or branched, saturated or unsaturated aliphatic residue (alkyl, alkenyl) of 6–20, preferably 8–16 carbon atoms; a monoalkylaromatic residue of 3–18, preferably 4–16 carbon atoms in the alkyl group, or a di- or oligoalkylaromatic residue of 1–18 carbon atoms per alkyl group, the total number of carbon atoms in the alkyl groups amount to 7–40 (oligo typically referring to 3 to 5 alkyl groups); m is 0–20, preferably 0–10; n is 2–100, preferably 3–50; and M is an alkali or alkaline earth metal ion or ammonium. Aryl in the foregoing generally is a hydrocarbon of 6–10 C-atoms, e.g., phenyl or 1- or 2-naphthyl.

The carboxymethylated oxethylates can be produced, for example, according to German Pat No. 2,418,444 by reaction of oxethylates of the formula

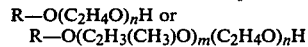
R—O(C$_2$H$_4$O)$_n$H or
R—O(C$_2$H$_3$(CH$_3$)O)$_m$(C$_2$H$_4$O)$_n$H with a salt of chloroacetic acid in the presence of an alkali metal hydroxide or other bases. However, other preparation methods are likewise suitable.

Alcohols, the oxethylates of which form the basis for the carboxymethylates, include, for example: hexyl alcohol, octyl alcohol, nonyl alcohol, decyl alcohol, undecyl alcohol, lauryl, tridecyl, myristyl, palmityl, and stearyl alcohol, but also unsaturated alcohols, such as, for example, oleyl alcohol. The alkyl chain can be normal- or branched-chain. Suitable alkyl phenols are, for example: propylphenol, butylphenol, pentylphenol, hexylphenol, octylphenol, nonylphenol, decylphenol, undecylphenol, dodecylphenol, tridecylphenol, cetylphenol, as well as the corresponding dialkyl phenols, such as, for example, 2-methyl-4-tridecylphenol, 2-dodecyl-4-ethylphenol, dinonylphenol, etc. The alkyl chain can be normal or branched. It is also possible to use trialkyl phenols, such as tri-n-butylphenol, tri-tert-butylphenol, dimethylnonylphenol, or tetraalkylphenols, such as tetrabutylphenol.

The oxethylation can take place in the presence of catalytic amounts of an alkali metal hydroxide with 0–20, preferably 0–10, especially 1–20 moles of propylene oxide/mole of hydroxy compound and thereafter with 2–100, preferably 3–50, especially 4–50 moles of ethylene oxide/mole of hydroxy compound. The thus-produced oxethylates are mixtures of homologs. The subsequent carboxymethylation can be complete if the process is conducted correspondingly, so that the carboxymethylated oxethylates are pure anionic tensides. Alternatively, with incomplete carboxymethylation, the products still contain more or less extensive amounts of unreacted oxethylate. Consequently, the formula

R—O(C$_3$H$_6$O)$_m$(C$_2$H$_4$O)$_n$CH$_2$COOM frequently represents a mixture with varying quantities of unreacted oxethylate. A degree of carboxymethylation can accordingly be defined. It has been found that mixtures having a degree of carboxymethylation of between 10 and 100%, preferably between 50 and 100%, and quite especially between 70 and 100%, are very effective.

For reasons of increased effectiveness, it may be advantageous to add, to the solution dispersion or emulsion of carboxymethylated oxethylates, other anionic tensides. Especially suitable in this connection are commercially available monoalkylbenzenesulfonates of 6–18, preferably 8–14 carbon atoms in the optionally branched alkyl chain, or di- or trialkylbenzenesulfonates of 1–16 carbon atoms per optionally branched alkyl chain, the total number of carbon atoms in the alkyl chains per molecule being 8–25, preferably 10–20. Also included are alkanesulfonates of 8–22, preferably 10–18 carbon atoms, furthermore alkyl sulfates of 8–20 carbon atoms, alkanol ether sulfates within the same carbon atom range in the alkyl group, as well as a degree of ethoxylation of 1–10 moles of ethylene oxide/mole, and alkylaryl ether sulfates of 6–14 carbon atoms in the alkyl chain, as well as a degree of oxethylation of 1–10 moles of ethylene oxide/mole. The weight ratio of carboxymethylated oxethylates to the added anionic tenside can range between 1:4 to 20:1, preferably 1:2 to 10:1.

It can furthermore be suitable to add to the tenside, cosolvents in the form of monohydric or polyhydric alcohols or alkyl ethers of polyhydric alcohols, the weight ratio of carboxymethylated oxethylates/cosolvent being 1:4 to 20:1, preferably 1:4 to 10:1. Suitable cosolvents or cotensides are monohydric alcohols of 3–8 carbon atoms, such as, for example, propanol isomers, butanol isomers, pentanol isomers, etc., or polyhydric alcohols of 3–8 carbon atoms, such as propanediol, butanediol, pentanediol, etc., or alkyl ethers of polyhydric alcohols, such as ethylene glycol monobutyl ether, diethylene glycol monobutyl ether, etc.

Finally, for reasons of lesser tenside adsorption and/or retention, it may be advantageous to inject the effective tenside fluid in the form of an emulsion. Since the PIT of the system of reservoir oil, formation water or flood water, tenside, optional additives, is to be, according to this invention, at least by 12° C. higher than the reservoir temperature, and the latter is almost always above 20° C. and in most cases even above 30° C., the emulsion should be water-external. The oil utilized can be the respective reservoir oil or the oil of some other deposit, or crude oil mixtures or crude oil fractions. When using an oil different from the reservoir oil, care should be taken that the PIT of the emulsion to be injected should approximately conform to that of the reservoir system. The water:oil ratio can be 20:1 to 1:2.

The amounts of active ingredient to be injected into the injection probes, i.e., the volume and concentration of the carboxymethylated oxethylates and optionally of the additives, are determined above all by the magnitude and pore volume of the oil carrier. Another decisive factor is constituted by the nature of the areas in the immediate vicinity of the injection probes which are to be freed of the residual oil. It will generally be sufficient to treat the injection zones up to the distance of about 3–20 m from the injection probes. Higher amounts of active agent can be useful, but higher expenses are also incurred by such utilization. Accordingly, between 0.005 and 0.2 PV of active agent solution should be injected. The tenside concentration should range between 0.05 and 7%. Tests conducted on the injectability of model formations have shown that, with identical total quantities of tensides, higher volumes and lower concentrations lead to more favorable results than the reverse case.

After adaptation, by laboratory tests, of the tenside system to the respective reservoir conditions by means of PIT measurement and evaluation of the tenside system with respect to its quantity, concentration, and volume based on the particular reservoir, the active agent solution is injected by means of pumps into the injection zones. Thereafter, the water flooding process is commenced or continued. Conduction of the preceding and/or following water flooding steps is fully in accordance with the prior art considerations.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight; unless otherwise indicated.

The examples involve injection tests conducted either on sandpiles or sandstone drill cores as laboratory-type model formations for the injection zone of the oil-bearing substrate. In case of sandpiles, 5% kaolin (bolus alba, specific surface area 14.5 m$^2$/g) was added, in part, in order to study the influence of a clay-containing formation on the process.

For the production of a sandpile, a thermostatable steel pipe having a length of 70 cm and a diameter of 5 cm, equipped with a temperature measuring means and a manometer, sealable at both ends by threaded closures with capillary inlet and pressure-maintaining valve outlet, was charged with edge-rounded quartz sand. Thereafter, the sandpile was wetted with salt water by means of a diaphragm pump and brought to the desired temperature by a thermostat. Pressure transmitters were used to determine the permeability of the pile. Then the latter was saturated with a model oil (n-decane or crude oil), during which step the adsorbed water content could be simultaneously determined.

Subsequently, salt water was injected at a rate of about 5 m/d until a degree of inundation of 98–100% constant over a rather long time period (about 0.5 PV) as well as a constant pressure gradient were obtained. In correspondence with the flooding rate $Q_1$, a pressure gradient $\Delta_{P1}$ was recorded. After this waterflooding, the active agent solution or dispersion was injected. Its concentration was 0.4–0.5%, its volume 2–3 PV in correspondence with the concept that the model formation is to represent only the foward portion of the injection zone, rather than the pore space between the injection probe and production probe. In many cases, already after a brief injection period, a strong lowering of the pressure gradient with constant injection rate was observed, or, alternatively, the injection rate could be greatly increased without an increase in the pressure gradient. Subsequently, additional salt water was injected. Under stationary conditions, the pressure gradient $\Delta_{P2}$ was then recorded at a flooding rate $Q_2$. A measure for the increase in injectability is the magnitude f which can be determined from the measured data as follows:

$$f = \frac{Q_2}{\Delta_{P2}} \cdot \frac{\Delta_{P1}}{Q_1}$$

If f larger than 1 applies, then an increase in injectability prevails. If f smaller than 1 applies, then the injectability is worsened.

Cylindrical drill cores having a length of 50 cm and a diameter of 8 cm, made up of Bentheim sandstone embedded in epoxy resin were utilized for producing model formations of consolidated rock. The pore volumes were about 600 ml. The resin-embedded cores were temperature-controlled by means of an open temperature-controlled bath. Otherwise there were no differences between the operation of these model formation as compared with the operation performed on sandpiles.

EXAMPLES 1 TO 15

The table below lists 12 examples according to this invention and 2 comparative examples. The following compounds were utilized:

| Oils: | |
|---|---|
| D | n-decane, 96% |

As demonstrated in examples according to this invention, a strong increase in injectability is achieved by the process disclosed in the claims.

TABLE

| No.* | Formation/Permeab. (D) | Temp. (°C.) | Formation Water | Oil | Tenside System | PIT (°C.) | ΔT*** | $Q_1$ m/d | $\Delta_{P1}$ bar/m | $Q_2$ m/d | $\Delta_{P2}$ bar/m | f |
|---|---|---|---|---|---|---|---|---|---|---|---|---|
| 1 | Core/2.3 | 53 | M | M | A | 65 | 12 | 5.7 | 1.8 | 5.9 | 0.4 | 4.7 |
| 2 (C) | Core/2.3 | 53 | M | M | B | 54 | 1 | 7.0 | 2.4 | 6.5 | 2.5 | 0.9 |
| 3 | Core/1.4 | 53 | M | M | C | 75 | 22 | 5.0 | 2.5 | 5.1 | 0.6 | 4.3 |
| 4 (C) | Core/2.5 | 60 | S | D | D | 69 | 9 | 4.9 | 1.0 | 6.4 | 2.2 | 0.6 |
| 5 | Core/1.2 | 30 | S | D | D | 69 | 39 | 5.4 | 1.0 | 10.1 | 0.6 | 3.1 |
| 6 | Core/1.2 | 60 | S | D | E | 87 | 17 | 13.4 | 2.4 | 23.1 | 1.8 | 2.3 |
| 7 | Core/1.1 | 30 | S | D | F | 104 | 74 | 4.8 | 2.9 | 9.5 | 2.8 | 2.0 |
| 8 | Core/2.0 | 40 | S | D | G | 57 | 17 | 5.9 | 2.4 | 10.0 | 0.6 | 6.8 |
| 9 | Sand/0.9 | 60 | S | A | E | 73 | 13 | 3.0 | 1.4 | 6.5 | 1.5 | 2.0 |
| 10 | Core/2.1 | 60 | S | A | H | 98 | 38 | 3.3 | 0.3 | 5.2 | 0.2 | 2.4 |
| 11 | Core/1.7 | 65 | S | A | I | 81 | 16 | 5.4 | 1.3 | 8.0 | 0.6 | 3.2 |
| 12 | Core/1.6 | 40 | L | A | C | 60 | 20 | 6.8 | 4.8 | 6.7 | 0.9 | 5.3 |
| 13 | Sand**/0.3 | 90 | S | A | L | >120 | >30 | 8.5 | 8.6 | 8.8 | 1.9 | 4.7 |
| 14 | Sand**/0.4 | 50 | S | A | L | >120 | >70 | 9.9 | 16.4 | 9.7 | 5.0 | 3.3 |

*(C) = Comparative examples
**Sand contains 5% kaolin
***ΔT = Difference between PIT and reservoir temperature

| | |
|---|---|
| A | $\eta_{20°C}$: 1.2 mPa.s<br>33° API crude oil (70% paraffinic, 11% naphthenic and 18% aromatic hydrocarbons),<br>$\eta_{20°C}$: 19 mPa.s |
| M | 40° API crude oil (66% paraffinic, 20% naphthenic and 13% aromatic hydrocarbons), |

Salt Water:

| | |
|---|---|
| M | formation water<br>(5.5% Na⁺, 1.2% Ca⁺⁺, 0.23% Mg⁺⁺, 0.05% K⁺, 11.3% Cl⁻) |
| S | synthetic seawater<br>(1.12% Na⁺, 0.035% K⁺, 0.047% Ca⁺⁺, 0.133% Mg⁺⁺, 2.02% Cl⁻, 0.27% SO₄²⁻) |
| L | formation water<br>(3.6% Na⁺, 0.15% K⁺, 0.26 Ca⁺⁺, 0.11% Mg⁺⁺, 5.78% Cl⁻) |

Tensides:

| | |
|---|---|
| A | carboxymethylated nonylphenol oxethylate sodium salt with 5.9 moles EO/mole, degree of carboxymethylation 100%, |
| B | carboxymethylated nonylphenol oxethylate sodium salt with 5.5 moles EO/mole, degree of carboxymethylation 98%, |
| C | carboxymethylated nonylphenol oxethylate sodium salt with 6.3 moles EO/mole, degree of carboxymethylation 100%, |
| D | carboxymethylated nonylphenol oxethylate sodium salt with 3.6 moles EO/mole, degree of carboxymethylation 80%, tert-butanol as cotenside, tenside/cotenside ratio 1:4, |
| E | carboxymethylated nonylphenol oxethylate sodium salt with 3.9 moles EO/mole, degree of carboxymethylation 86%, |
| F | carboxymethylated nonylphenol oxethylate sodium salt with 4.4 moles EO/mole, degree of carboxymethylation 90%, |
| G | carboxymethylated nonylphenol block propoxyoxethylate sodium salt with 8 moles PO/mole and 3.5 moles EO/mole, degree of carboxymethylation 71%, |
| H | carboxymethylated nonylphenol oxethylate sodium salt with 3.9 moles EO/mole, degree of carboxymethylation 90%, |
| I | carboxymethylated "Alfol 1218" oxethylate with 3 moles EO/mole, degree of carboxymethylation 90%, |
| K | carboxymethylated nonylphenol oxethylate sodium salt with 4.7 moles EO/mole, degree of carboxymethylation 95%, |
| L | carboxymethylated nonylphenol oxethylate sodium salt with 6 moles EO/mole, degree of carboxymethylation 85%. |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for increasing the injectability of an injection well used in the extraction of oil from a deposit by means of water flooding, comprising injecting in the well a solution, dispersion, or emulsion of a tenside and in the case of an emulsion also oils, in formation water or flooding water, wherein the tenside is a mixture of 10–100 wt % of carboxymethylated oxethylates of the formula

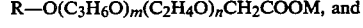

and 0–90 wt % of (propoxy)ethoxylates of the formula

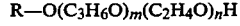

wherein R is a hydrocarbon aliphatic group of 6–20 carbon atoms, a monolkyl-$C_{6-10}$-aromatic group of 3–18 carbon atoms in the alkyl group, or a di- or oligoalkyl-$C_{6-10}$-aromatic group of 1–16 carbon atoms per alkyl group, the total number of carbon atoms in the alkyl groups per molecule being 7–40; m is 0 to 20; n is 2 to 100; M is an alkali or alkaline earth metal ion or ammonium, the tenside being selected such that the phase inversion temperature of the system: reservoir oil/formation water or flooding water/tenside/optional additives is at least 12° C. above the deposit temperature.

2. A process of claim 1, wherein the concentration of the tenside in the fluid to be injected is 0.05–7 wt %.

3. A process of claim 1, wherein the slug size of the tenside fluid injected is 0.005 to 0.2 pore volume.

4. A process of claim 1, wherein formation water or flooding water is injected into the deposit after injection of the tenside slug.

5. A process of claim 1, wherein there additionally is injected another anionic tenside, a mono- or polyhydric alcohol or an alkyl ether of a polyhydric alcohol.

6. A process of claim 5, wherein the weight ratio of said additive to said tenside mixture is 4:1 to 1:20.

7. A process of claim 6, wherein the additive is another anionic tenside and said ratio is 1:2–10:1.

8. A process of claim 6, wherein the additive is a mono- or polyhydric alcohol or an alkyl ether of a polyhydric alcohol and said ratio is 1:4 to 10:1.

9. A process of claim 1, wherein the emulsion is injected.

10. A process of claim 8, wherein in said emulsion, the water:oil ratio is 20:1 to 1:2.

11. A process of claim 1, wherein said phase inversion temperature lies 15°–120° C. above the deposit temperature.

12. A process of claim 1, wherein said phase inversion temperature lies 20°–120° C. above the deposit temperature.

13. A process of claim 1, wherein the tenside fluid is a solution.

14. A process of claim 1, wherein the tenside fluid is a dispersion.

15. A process of claim 1, wherein R is an alkyl group of 8–16 C atoms; m is 0–10; and n is 3–50.

16. In a process for recovering oil from an oil-bearing deposit comprising the steps of injecting a fluid into said deposit via an injection well, driving the fluid through the deposit to displace oil therefrom and recovering the displaced oil, the improvement comprising, before or during said steps, increasing the injectability of the injection well by carrying out the process of claim 1.

* * * * *